United States Patent
Kulkarni et al.

(10) Patent No.: US 11,237,944 B2
(45) Date of Patent: Feb. 1, 2022

(54) CODE PROFILING SYSTEM AND ASSOCIATED METHODS

(71) Applicant: Walmart Apollo, LLC, Bentonville, AR (US)

(72) Inventors: Praveen Kumar Kulkarni, Bangalore (IN); Ashish Singh Shah, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/823,954

(22) Filed: Mar. 19, 2020

(65) Prior Publication Data

US 2020/0301816 A1    Sep. 24, 2020

Related U.S. Application Data

(60) Provisional application No. 62/892,965, filed on Aug. 28, 2019.

(30) Foreign Application Priority Data

Mar. 20, 2019 (IN) .............................. 201911010878

(51) Int. Cl.
*G06F 11/34* (2006.01)
*G06F 11/36* (2006.01)

(52) U.S. Cl.
CPC ...... *G06F 11/3612* (2013.01); *G06F 11/3409* (2013.01); *G06F 11/3466* (2013.01); *G06F 11/3664* (2013.01); *G06F 2201/865* (2013.01)

(58) Field of Classification Search
CPC .. G06F 11/36; G06F 11/3604; G06F 11/3612; G06F 11/3636–3664

(Continued)

(56) References Cited

U.S. PATENT DOCUMENTS 7,451,206 B2 * 11/2008 Geck ........................ H04L 29/06
                                                              709/218
7,954,011 B2 * 5/2011 Ivanov ................ G06F 11/3495
                                                              714/45

(Continued)

OTHER PUBLICATIONS

Joseph, I., et al., Performance and Energy Consumption Analysis of Java Code utilizing Embedded GPU, IEEE 27th Canadian Conference on Electrical and Computer Engineering (CCECE), May 4-7, 2014, 6 pages, [retrieved on Sep. 14, 2021], Retrieved from the Internet: <URL:http://ieeexplore.ieee.org/>.*

(Continued)

*Primary Examiner* — Geoffrey R St Leger
(74) *Attorney, Agent, or Firm* — Fitch, Even, Tabin & Flannery LLP

(57) ABSTRACT

Described in detail herein is a profiling system. In one embodiment, a computing system can be configured to generate a graphical user interface through which a profiling application is configured, and receive a first request for initiating profiling of an executable module including one or more data structures via the graphical user interface. The computing system can further initiate the profiling of the executable module via the graphical user interface based on the information associated with the executable module, determine a first processor utilization and a first memory utilization during execution of the executable module, generate a first utilization snapshot from the first processor utilization and a first memory snapshot from the first memory utilization at a specified period of time during execution of the executable module, and store the first utilization and first memory snapshot in the database.

20 Claims, 18 Drawing Sheets

(58) Field of Classification Search
USPC .................................................. 717/124–131
See application file for complete search history.

(56) References Cited

U.S. PATENT DOCUMENTS

| | | | |
|---|---|---|---|
| 8,527,960 B2* | 9/2013 | Schmelter | G06F 11/3636 |
| | | | 717/128 |
| 8,881,111 B1* | 11/2014 | Smith | G06F 11/3688 |
| | | | 717/125 |
| 2008/0098358 A1* | 4/2008 | Shekov | G06F 11/3495 |
| | | | 717/128 |
| 2011/0138363 A1* | 6/2011 | Schmelter | G06F 11/3636 |
| | | | 717/128 |
| 2011/0283266 A1* | 11/2011 | Gallagher | G06F 9/44 |
| | | | 717/130 |

OTHER PUBLICATIONS

Ramachandra, A., et al., Analysis of CPU Utilisation and Stack Consumption of a Multimedia Embedded System, 4th IEEE International Symposium on Electronic Design, Test and Applications, Jan. 23-25, 2008, 6 pages, [retrieved on Sep. 14, 2021], Retrieved from the Internet: <URL:http://ieeexplore.ieee.org/>.*

* cited by examiner

CODE PROFILING SYSTEM AND ASSOCIATED METHODS

RELATED APPLICATIONS

This application claims priority to Indian Patent Application No. 201911010878, filed on Mar. 20, 2019 and entitled "Code Profiling System and Associated Methods" and to U.S. Provisional Patent Application No. 62/892,965, filed on Aug. 28, 2019 and entitled "Code Profiling System and Associated Methods", which are incorporated by reference herein in their entirety.

BACKGROUND

Code profiling is an advanced engineering technique that analyzes a program dynamically.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
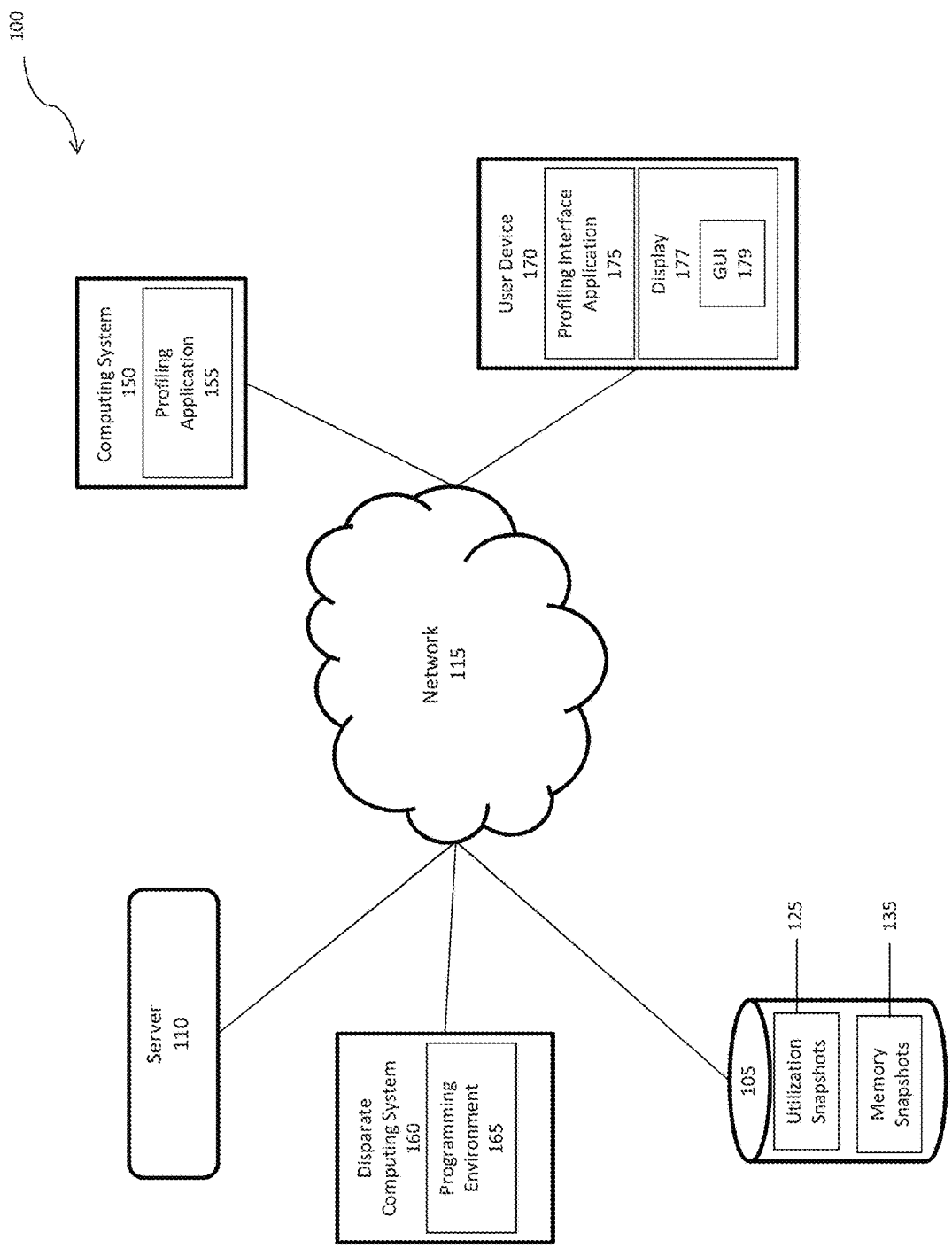
FIG. 1 is a block diagram illustrating a profiling system in accordance with an exemplary embodiment.

Described in detail herein is a profiling system. In one embodiment, the profiling system can include a computing system in communication with a database. The computing system can be configured to generate a graphical user interface through which a profiling application is configured and a request for initiating profiling of an executable module is received. The executable module can include one or more data structures. The request can include information associated with the executable module. The computing system can further initiate profiling of the executable module via the graphical user interface based on the information associated with the executable module, determine a first processor utilization and a first memory utilization during execution of the executable module, generate a first utilization snapshot from the first processor utilization and a first memory snapshot from the first memory utilization at a specified period of time during execution of the executable module, and store the first utilization and first memory snapshot in the database.

The utilization snapshot can include data associated with computer processor unit (CPU) utilization by the one or more data structures of the executable module. The memory snapshot can include data associated with memory usage by the one or more data structures of the executable module.

The computing system can be configured to initiate profiling of the executable module in a sampling mode or a tracing mode. In response to initiating profiling in the sampling mode, the computing system can periodically execute one or more queries of the one or more data structures in the executable module to determine CPU time required by each of the one or more data structures during execution. In response to initiating profiling in the tracing mode, the computing system can instrument bytecode of the executable module for recording thread CPU time spent inside each profiled data structure. Both times and invocation counts can be captured.

The system can further include a user device executing an application. The application when executed can render a graphical user interface (GUI) including graphical representations of the first utilization snapshot and the first memory snapshot. The GUI can include previous utilization and memory snapshots captured prior to the first utilization and first memory snapshots. The computing system can receive a second request from the user device to: generate a first graphical representation of a comparison of the first utilization snapshot and a second utilization snapshot captured before the first utilization snapshot; query the database to retrieve the second utilization snapshot; generate the first graphical representation of the comparison of the first and second utilization snapshots; and/or instruct the user device to render the first graphical representation, via the application. The computing system can be configured to receive a third request from the user device to: generate a second graphical representation of a comparison of the first memory snapshot and a second memory snapshot captured before the first utilization snapshot; query the database to retrieve the second memory snapshot; generate the second graphical representation of the comparison of the first and second memory snapshots; and/or instruct the user device to render the second graphical representation, via the application. The first and second graphical representations can include a breakdown by each of the one or more data structures of the executed module.

Embodiments of the system described herein provides advantages over conventional systems. For example, the system described herein eliminates the need to share license keys and expose the tool as a service. Embodiment of the system advantageously enable developers to setup profiling parameters at a click of buttons and restart their application; start or stop snapshot capturing via a user interface-leverage profiling tool features; archive snapshots in a central repository for historic reference; and compare two or more snapshots to visually highlight differences and facilitate improvements in the code to reduce processor utilization and/or memory utilization.

FIG. 1 illustrates an exemplary profiling system 100 in accordance with an exemplary embodiment. The profiling system 100 can include one or more databases 105, one or more servers 110, one or more computing systems 150, one or more disparate computing system 160, and one or more user devices 170. In exemplary embodiments, the computing system 150 can be in communication with the databases 105, the server(s) 110, the disparate computing system 160, and user devices 170, via a communications network 115. The computing system 150 can execute a profiling application 155 to facilitate code profiling processes. The user device 170 can execute an instance of a profiling interface application 175 and can include a display 177 which can render a GUI 179. The disparate computing system 160 can include a software programming and/or development environment 165.

In an example embodiment, one or more portions of the communications network 115 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 110 includes one or more computers or processors configured to communicate with the computing system 150, the disparate computing system 160, and user device 170. The server 110 hosts one or more applications configured to interact with one or more components of the computing system 150 and/or facilitates access to the content of the databases 105. The databases 105 may store information/data, as described herein. For example, the databases 105 can include a utilization snapshot database 125 and a memory snapshot database 135. The utilization snapshot database 125 can store utilization snapshots and the memory snapshot database can store memory snapshots generated based previous iteration of code profiling via the profiling application 155 and/or profiling interface application 175. The databases 105 can be located at one or more geographically distributed locations from the computing system 150. Alternatively, the databases 105 and the computing system 150 can be co-located at the same geographic location.

In one embodiment, the user device 170 can transmit a first request for initiating profiling of an executable module including one or more data structures via the GUI 179 rendered on a display of the user device by the profiling interface application 175. The request can include information associated with the executable module. For example, the information associated with the executable module can include a storage/memory location of the executable module. In one embodiment, the executable module can be located on the disparate computing system 160 and executed in the programming environment 165 of the disparate computing system 160. In another embodiment, the executable module can be located and executed on the computing system 150.

In response to receiving the request from the user device 170, the profiling application 155 of the computing system 150 can initiate profiling of the executable module based the information associated with the executable module. The profiling application 155 facilitate execution of the executable module and can determine a first processor utilization and a first memory utilization associate with the executable module during the execution of the executable module. The profiling application can generate a first utilization snapshot from the first processor utilization and a first memory snapshot from the first memory utilization associated with a specified period of time during the execution of the executable module. Utilization snapshots can include data associated with central processing unit (CPU) utilization by one or more data structures of the executable module. The memory snapshot can include data associated with memory usage by the one or more data structures of the executable module. The profiling application 155 can store the first memory snapshot in the memory snapshot database 135 and the first utilization snapshot in the utilization snapshot database 125.

In one embodiment, the request for profiling the executable module can include a request for profiling the executable module in a sampling mode or a tracing mode. In response to the request including a request for profiling the executable module in the sampling mode, the profiling application 155 can periodically query stacks of running threads (i.e., data structures) to estimate slowest parts of the code and/or parts of the code that have higher CPU utilization relative to other parts of the code. The sampling mode can locate and discover performance bottlenecks (e.g., high CPU or memory utilization) that contribute to inefficient and/or problematic execution of the executable module. With sampling, the profiling application 155 adds virtually no overhead to the executable module (i.e., the profiled application). In response to the request, which includes a request for profiling the executable module in tracing mode, the profiling application 155 can instrument bytecode of the executable module for recording thread CPU time spent inside each profiled data structure. Both times and invocation counts can be captured.

In one embodiment, the user device 170 can transmit a request to view a graphical representation of a memory or utilization snapshot, via the profiling interface application 175. The profiling application 155 can retrieve the requested memory or utilization snapshots from the utilization snapshot database 125 and/or the memory snapshot database 135. The profiling application 155 can generate and/or provide data for a graphical representation of the memory or utilization snapshot and instruct the profiling interface application 175 to render the graphical representation of the memory or utilization snapshot on the GUI 179 rendered on the display 177. The graphical representation can include one or more of graph, charts, or a list of data structures and information associated with each data structure of the executable module (the profiled application). The graphs and charts can indicate the memory or processor utilization of the data structures of the executable module. The graphical representation can include a breakdown by each of the one or more data structures of the executable module.

In embodiment, the GUI 179 of the profiling interface application 175 can render a list of previously captured memory or utilization snapshots of execution of one or more executable modules. Each of the snapshots can correspond to snapshots captured at different specified execution times and dates of one or more executable modules. The user device 170 can receive a selection of two or more memory or utilization snapshots of one or more executable modules. In response to receiving the selection, the user device 170 can transmit a request for generating a comparison between the selected memory or utilization snapshots of one or more executable modules. The profiling application 155 can retrieve the selected two or more memory or utilization snapshots and generate graphical representations of a comparison of the selected two or more memory or utilization snapshots. The profiling application 155 can instruct the profiling interface application 175 executed on the user device 170 to render the graphical representation of the comparison.

Figure 2:
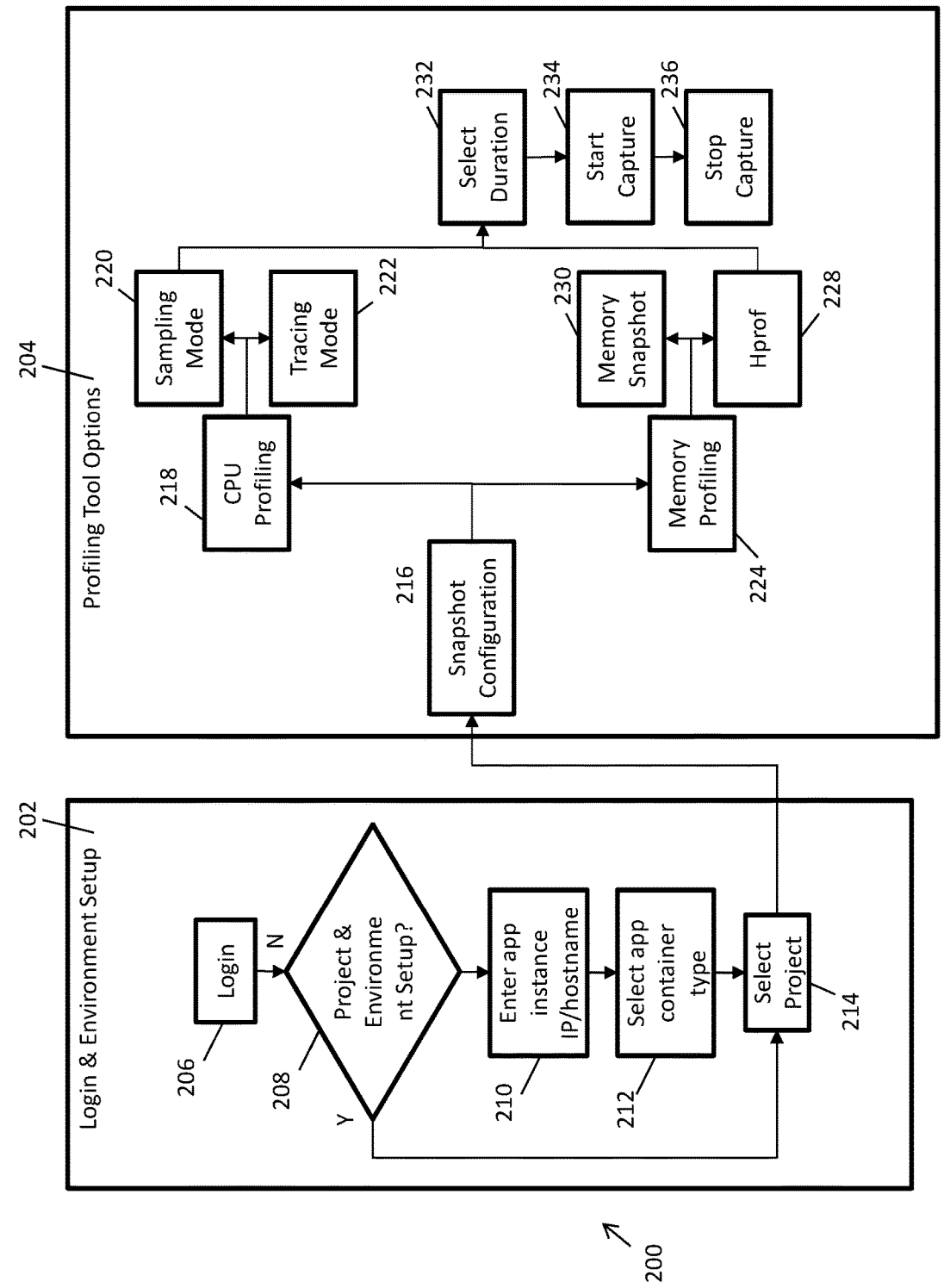
FIG. 2 depicts a setup process for profiling an executable module in accordance with an exemplary embodiment.

FIG. 2 depicts a setup process 200 for profiling an executable module. The profiling interface application (e.g., profiling interface application 175 as shown in FIG. 1) executing on the user device (e.g., user device 170 as shown in FIG. 1) can render a login & environment setup interface 202 on the GUI (e.g., GUI 179 as shown in FIG. 1). In operation 206, the GUI can render a login screen. The user device can receive login credentials from the user. The login credentials can be used to authenticate the user before the user is granted access to the profiling interface application 175. Once authenticated, in operation 208, the GUI can render a prompt asking whether a project & environment setup has previously created. In response to creating a new project & environment setup, in operation 210, the user device can receive an application instance Internet Protocol (IP)/hostname associated with the executable module to be profiled. In operation 212, the user device can receive an application container type associated with the executable module to be profiled. In response to operation 212 or in response to confirming that the project & environment setup has already been created, the user device can receive a selection from the user of a project associated with an executable module to be profiled. The selected project can be transmitted to the profiling application (e.g., profiling application 155 as shown in FIG. 1) being executed on the computing system (e.g., computing system 150 as shown in FIG. 1).

In operation 216, the profiling application executed on the computing system can determine a snapshot configuration for the snapshot to be generated for the selected project. In operation 218, in response to determining that a utilization snapshot is to be generated in operation 218, profiling application executed on the computing system can determine whether sampling mode 220 or tracing mode 222 has been selected.

In response to determining that a memory snapshot is to be generated in operation 224, the profiling application executed on the computing system can determine whether a memory snapshot 230 or Hprof 228 is to be generated. Hprof 228 is a profiling tool called for heap and cpu profiling, and can generate data in textual or binary format, which can be used to track down and isolate performance problems involving memory usage and inefficient code. In operation 232, the profiling application executed on the computing system can select a duration of time for profiling. In operation 234, the profiling application executed on the computing system can initiate execution of the executable module and profiling of the executable module. Execution and profiling of the executable module can proceed according to the selected sampling mode or tracing mode for the CPU utilization profiling and/or the selected memory snapshot or Hprof 228 for the memory profiling. In operation 236, the profiling application executed on the computing system can terminate execution and profiling of the executable module.

Figure 3:
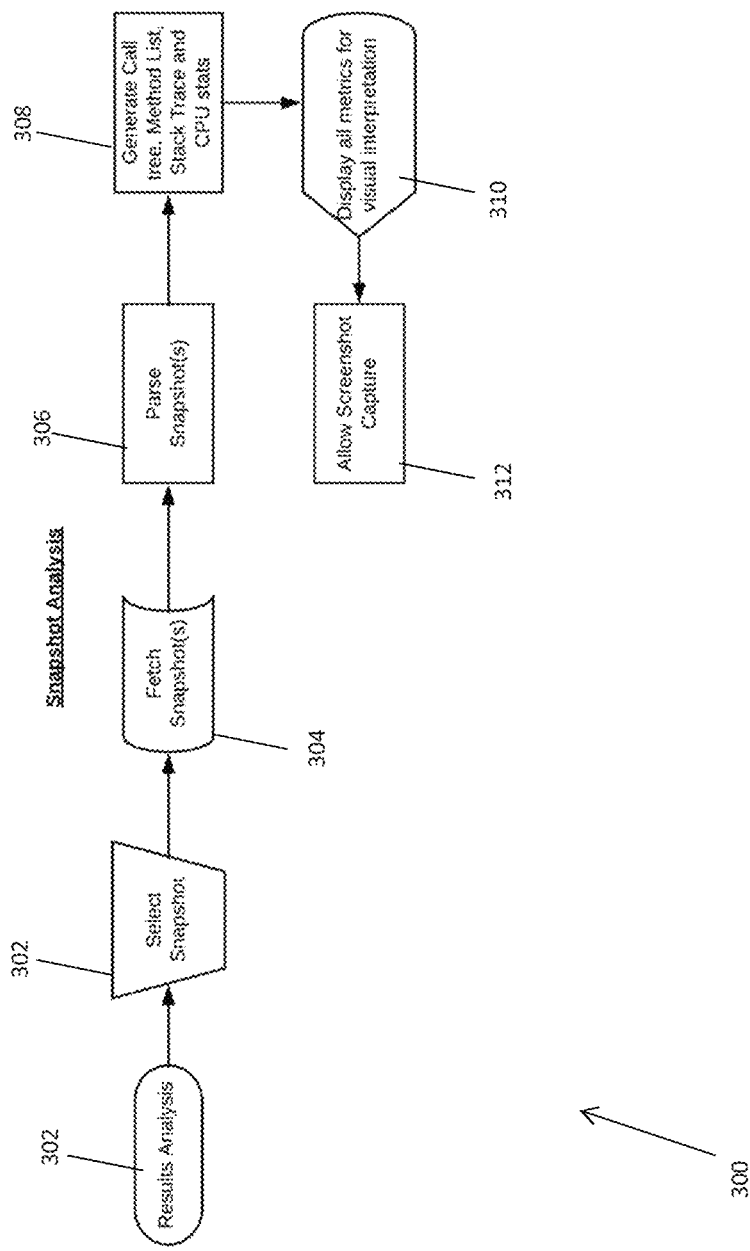
FIG. 3 depicts a snapshot analysis process in accordance with an exemplary embodiment.

FIG. 3 depicts a snapshot analysis process 300 in accordance with an exemplary embodiment of the present disclosure. In operation 302, the profiling application (e.g., profiling application 155 as shown in FIG. 1) executed on the computing system (e.g., computing system 150 as shown in FIG. 1) can initiate an analysis on results of a snapshot. In operation 304, the profiling application executed on the computing system can receive a selection of one or more previously captured snapshots. In operation 306, the profiling application executed on the computing system can retrieve the one or more previously captured snapshots from the utilization snapshot database (e.g., utilization snapshot database 125 as shown in FIG. 1) or the memory snapshot database (e.g., memory snapshot database 135 as shown in FIG. 1). In operation 306, the profiling application executed on the computing system can parse the previously captured snapshots. In operation 308, the profiling application executed on the computing system can generate call tree, method list, stack trace, and CPU statistics from the parsed snapshots. In operation 310, the profiling application executed on the computing system can instruct the profiling interface application (e.g., profiling interface application 175 as shown in FIG. 1) to render the metrics generated in the previous operation, on the GUI (e.g., GUI 179 as shown in FIG. 1). In operation 312, the profiling application executed on the computing system can allow for a screen-shot capture.

Figure 4:
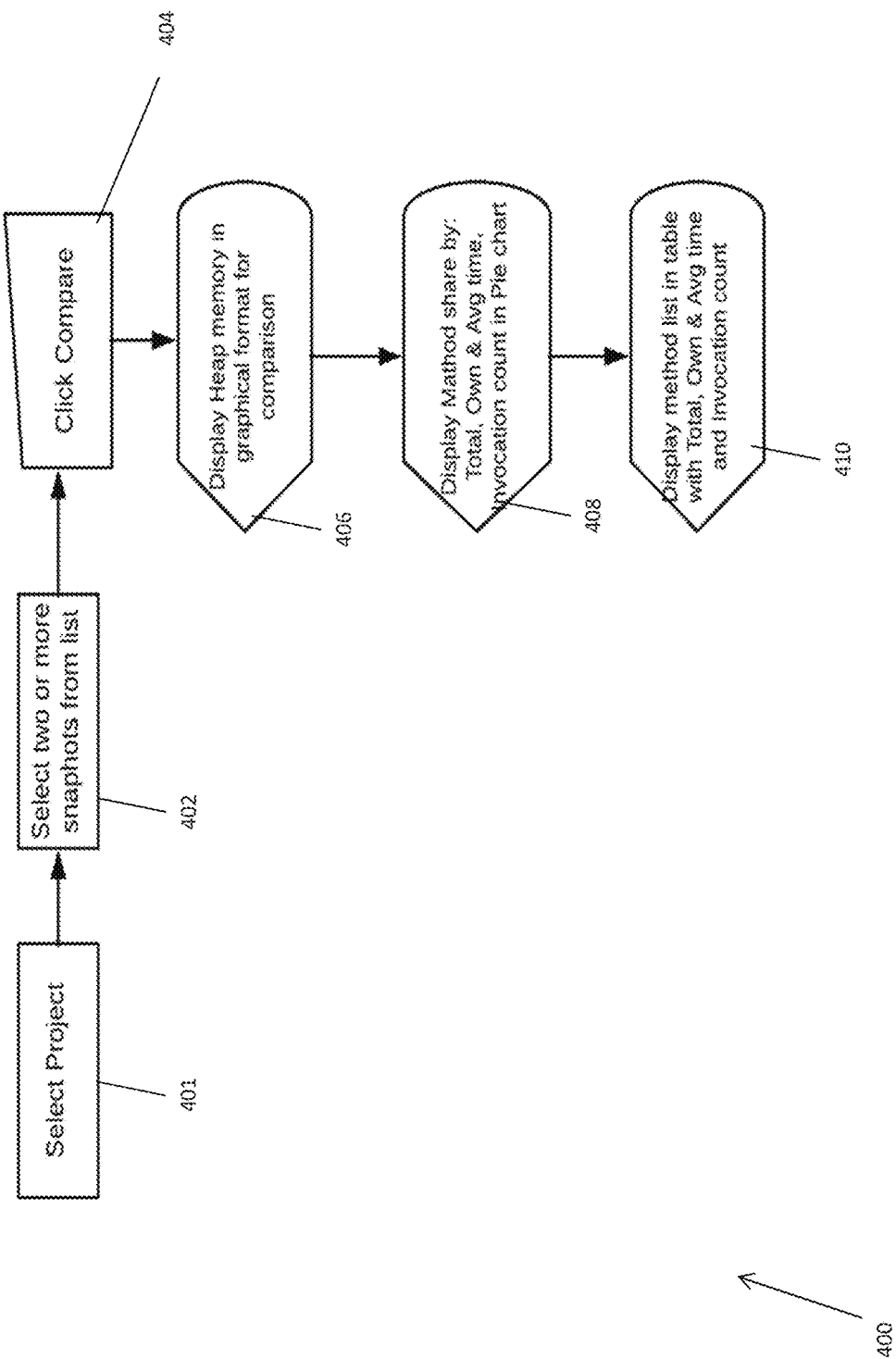
FIG. 4 depicts a memory analysis process in accordance with an exemplary embodiment.

FIG. 4 depicts a memory analysis process 400 in accordance with an exemplary embodiment of the present disclosure. In operation 401, the profiling application (e.g., profiling application 155 as shown in FIG. 1) executed on the computing system (e.g., computing system 150 as shown in FIG. 1) can receive a selection of a project associated with an executable module for memory analysis. In operation 402, the profiling application executed on the computing system can receive a selection of two or more snapshots associated with the project. In operation 404, the profiling application executed on the computing system can receive a request to compare the two or more snapshots. In operation 406, the profiling application executed on the computing system can instruct the profiling interface application (e.g., profiling interface application 175 as shown in FIG. 1) executed on the user device (e.g., user device 170 as shown in FIG. 1) to render a graphical representation of heap memory usage for comparison on the GUI (e.g., GUI 179 as shown in FIG. 1). In operation 408, the profiling application executed on the computing system can instruct the profiling interface application executed on the user device to render a graphical representation of method (i.e., data structures) share by total, ownership and average time, and/or invocation count, as a chart (e.g., a pie chart). In operation 410, the profiling application executed on the computing system can instruct the profiling interface application executed on the user device to render the a graphical representation of method share by total, ownership and average time, and/or invocation count, in a table format.

Figure 5:
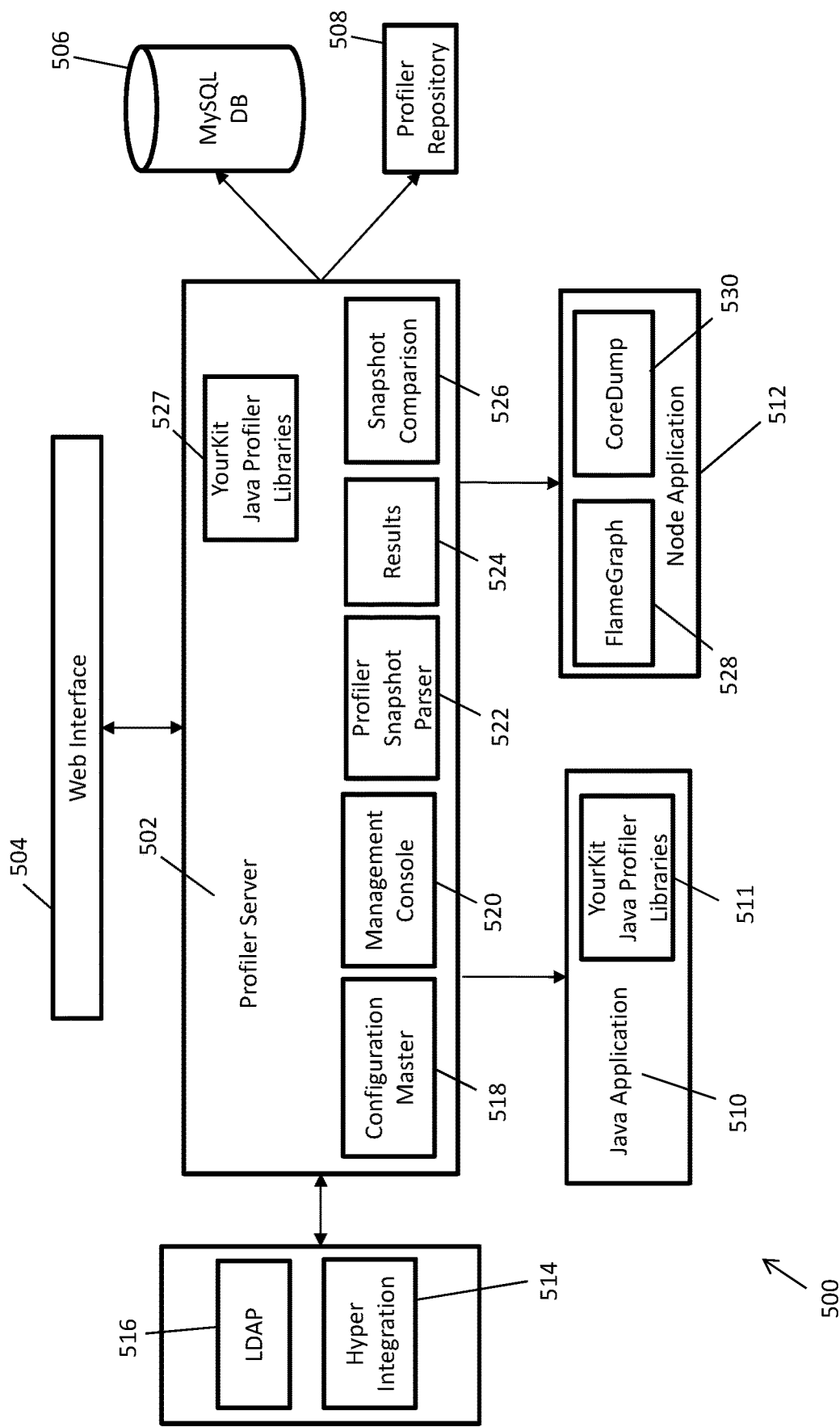
FIG. 5 depicts an exemplary architecture for code profiling in accordance with an exemplary embodiment.

FIG. 5 depicts an exemplary architecture 500 of the profiling system in accordance with an exemplary embodiment of the present disclosure. The architecture 500 can include a profile server 502 (i.e., computing system 150 as shown in FIG. 1), a web-interface 504, a database 506, a profile repository 508, a java application 510, a node application 512, hyper integration module 514, and Lightweight Directory Access Protocol (LDAP) 516. The java application 510 can include profiling libraries and can be embodied by profiling application (e.g., profiling application 155 as shown in FIG. 1). The web-interface 504 can render a GUI on the user device (e.g., user device 170 as shown in FIG. 1).

The profile server 502 can include a configuration master 518, management console 520, profiler snapshots parser 522, results 524, a snapshot comparison 526, and Java profiler libraries 527. The configuration master 518 can determine and implement configurations of the executable module to be profiled. The management console 520 can manage the profiling process. The profiler snapshots parser 522 can parse snapshots associated with profiling one or more executable modules. The results 524 can include data captured from the snapshots. The snapshot comparison 526 can generate comparisons of various snapshots.

The java application 510 can include Java profiler libraries 511. The node application 512 can include services, such as FlameGraph 528 and CoreDump 530.

The profile server 502 can transmit captured snapshots to the database 506 and profile repository 508 for storage. The profile server 502 can interface with the web-interface 504, database 506, profile repository 508, java application 510, a node application 512, hyper integration module 514, and LDAP 516.

Figure 6A:
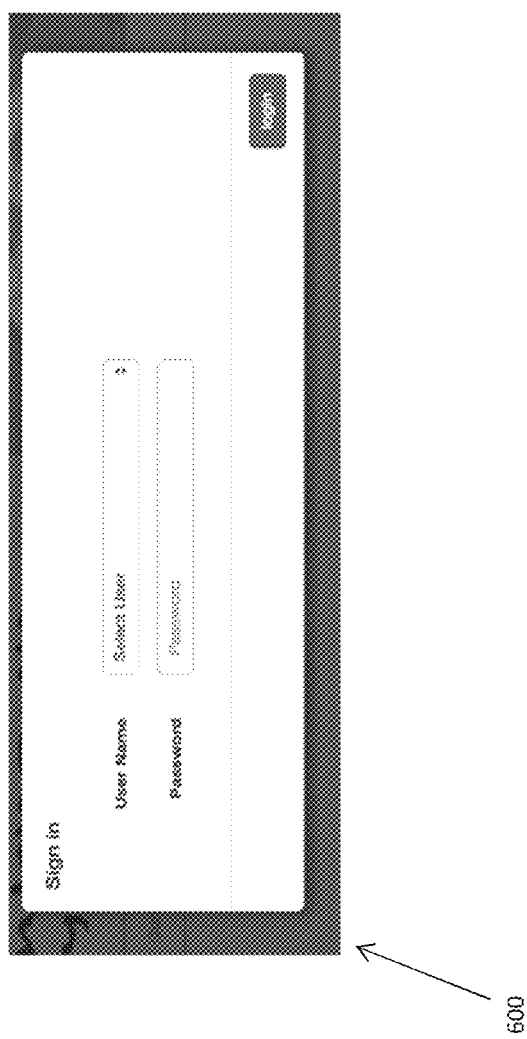
FIG. 6A-I depict exemplary graphical user interfaces (GUIs) of a code profiling system in accordance with exemplary embodiments of the present disclosure.
Figure 6B:
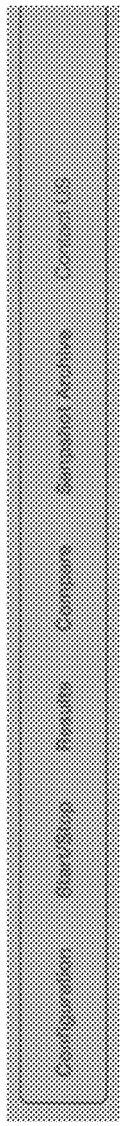

FIGS. 6A-6I are exemplary GUIs rendered by the profiling interface application executed on the user device. With reference to FIG. 6A, a login screen 600 can be rendered on the display (e.g., display 177 as shown in FIG. 1) of the user device (e.g., user device 170 as shown in FIG. 1) when the profiling interface application (e.g., profiling interface application 175 as shown in FIG. 1) is executed. A user can input a username and password to login to the profiling interface application. With reference to FIG. 6B, a toolbar screen 602 can be rendered on the display of the user device in response to successfully logging into the profiling interface application. The toolbar screen 602 can include profiling options for selection such as configuration, start/stop, results, compare, snapshot archive, and contact us.

Figure 6C:

With reference to FIG. 6C, in response to selecting the configuration option from the toolbar screen as shown in 6B, a configuration navigation screen 604 can be rendered on the display of the user device. The configuration navigation screen 604 can used to configure the profiling application virtual machine (VM) for profiler setup. None of the production VMs may be allowed to be configured. If user tries configure a production VM, an error message can be displayed. All the fields can be mandatory, and in response to a successful configuration, a success message can be be displayed. The fields for configuration can include: project name, feature, release, host machine, user name, public key, private key, passphrase, and container type The container type can indicate the container where the application is hosted.

Figure 6D:
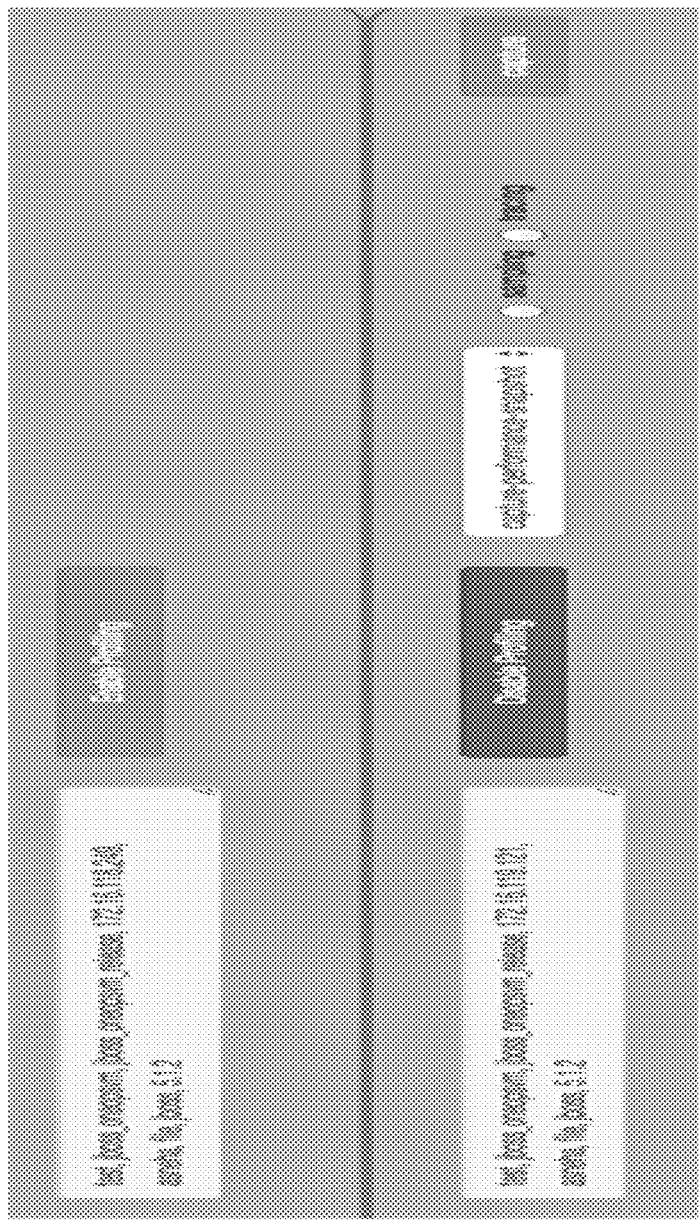

With reference to FIG. 6D, in response to selecting the start/stop option from the toolbar screen as shown in 6B, a start/stop navigation screen 606 can be rendered on the display of the user device. Once the VM is successfully configured through configuration navigation as shown in FIG. 6C, all the VMs corresponding to the project associated with an executable module to be profiled can be listed under the start/stop navigation screen 606. From the start/stop navigation screen 606, profiling on the VM can be enable/disable and profiling snapshots can be captured.

Figure 6E:
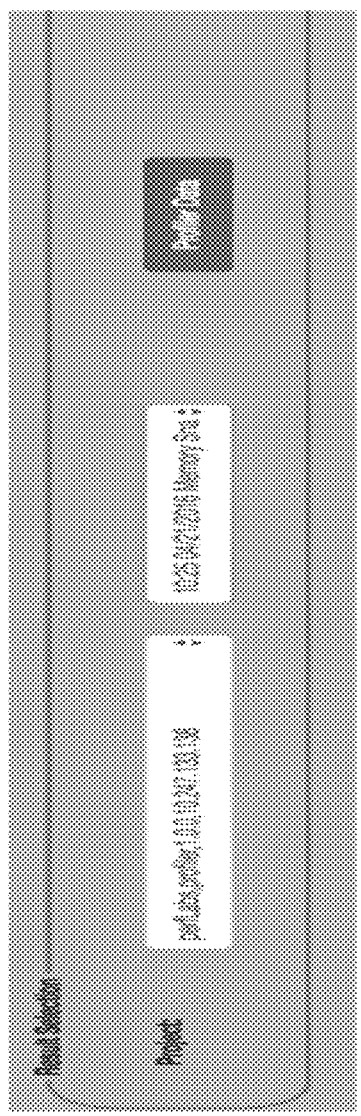

With reference to FIG. 6E, in response to selecting the results option from the toolbar screen as shown in FIG. 6B, a results screen 608 can be rendered on the display of the user device. All the successful snapshots can be viewed and/or downloaded under results navigation 608 and can be downloaded.

With reference to 6F, in response to selecting the compare snapshots option from the toolbar screen as shown in FIG. 6B, a compare navigation screen 610 can be rendered on the display of the user device. Using the compare navigation screen 610, a user can select two different snapshots to compare to understand changes in the executable module in terms of memory and CPU utilization from different releases or versions of the executable module.

Figure 6F:
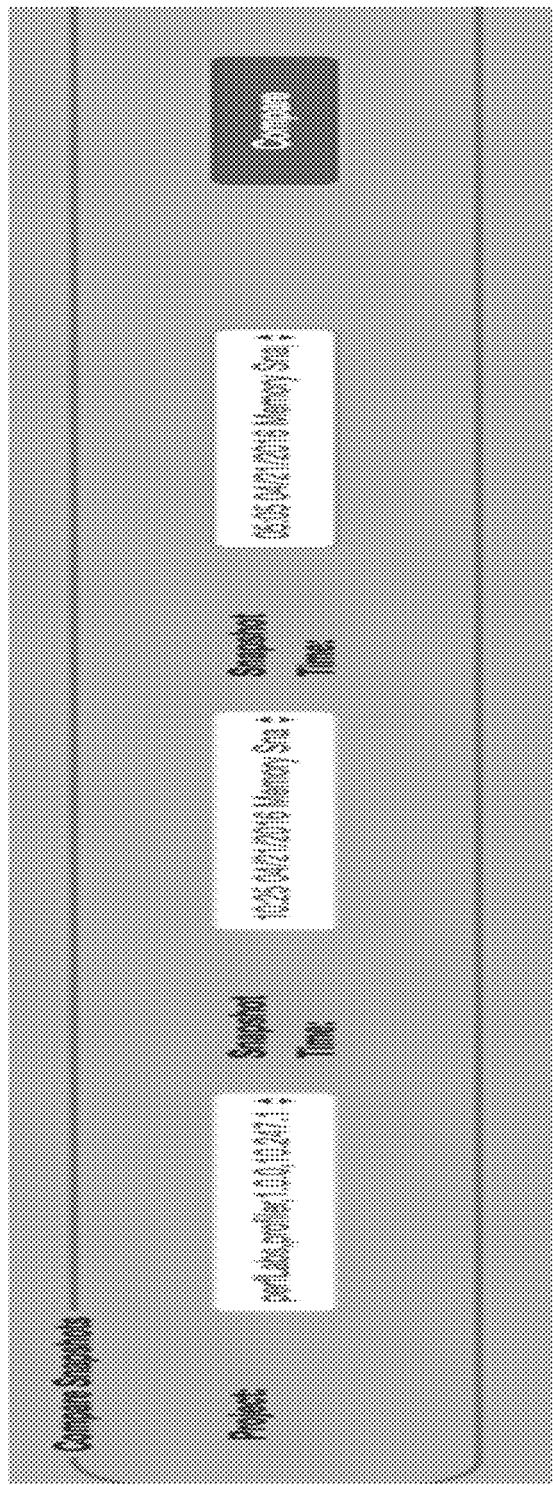
Figure 6G:
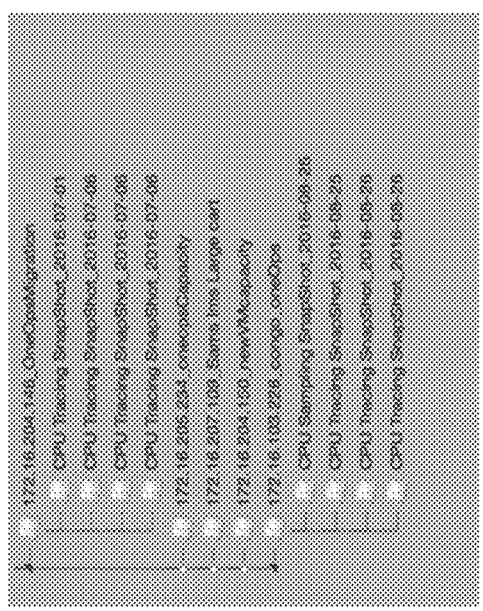
Figure 6F:
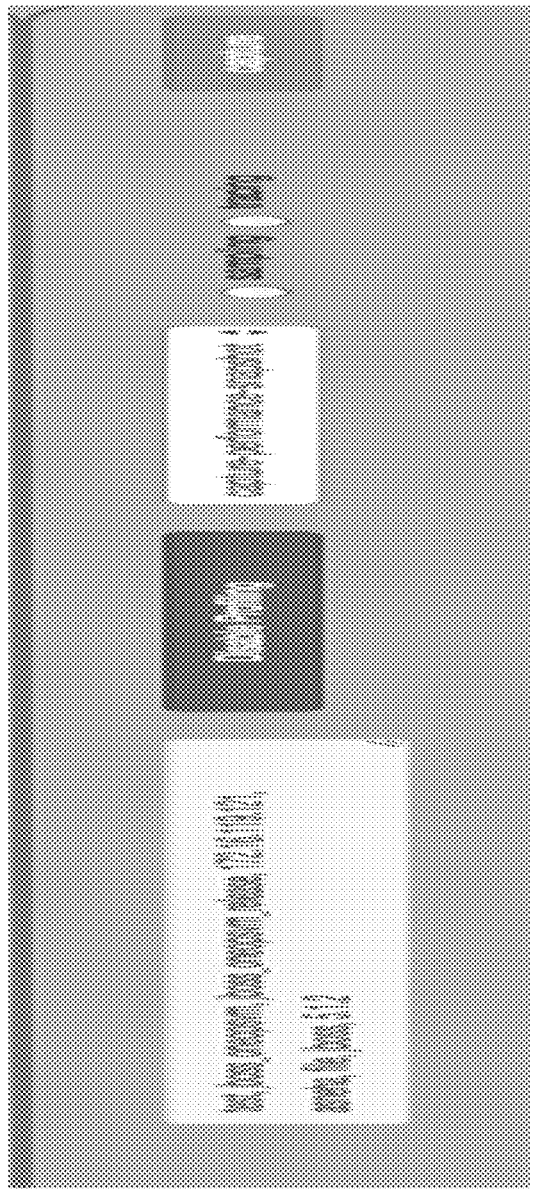
Figure 6G:
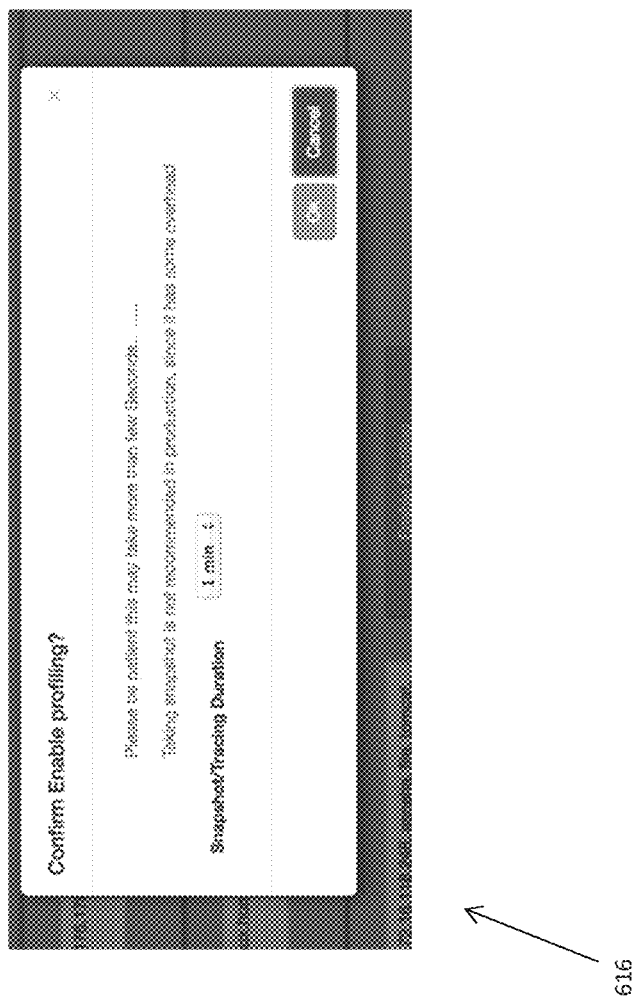
Figure 6H:
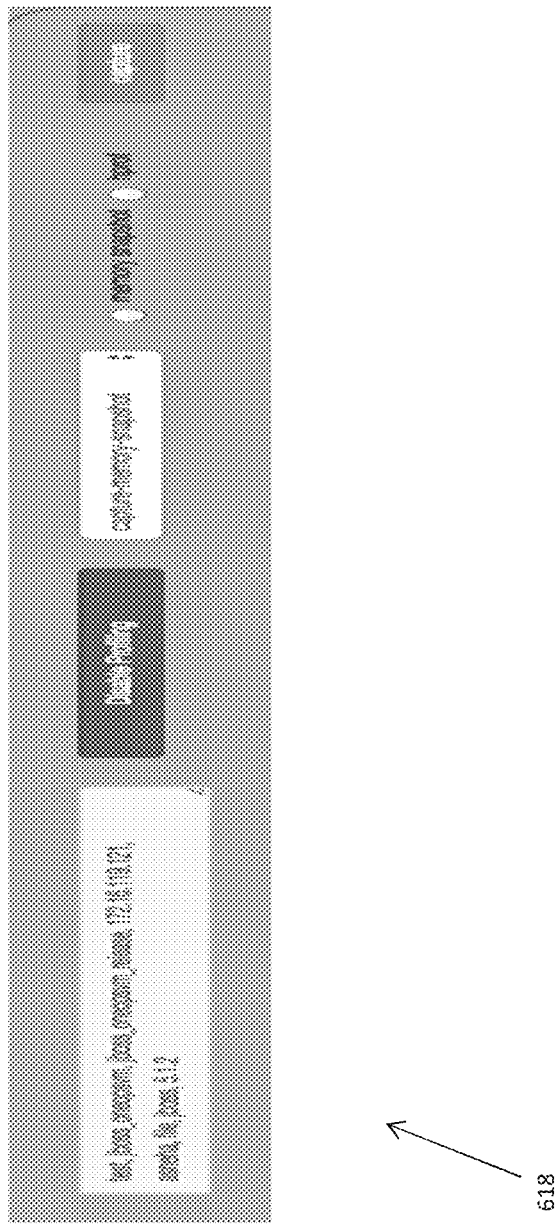
Figure 6I:
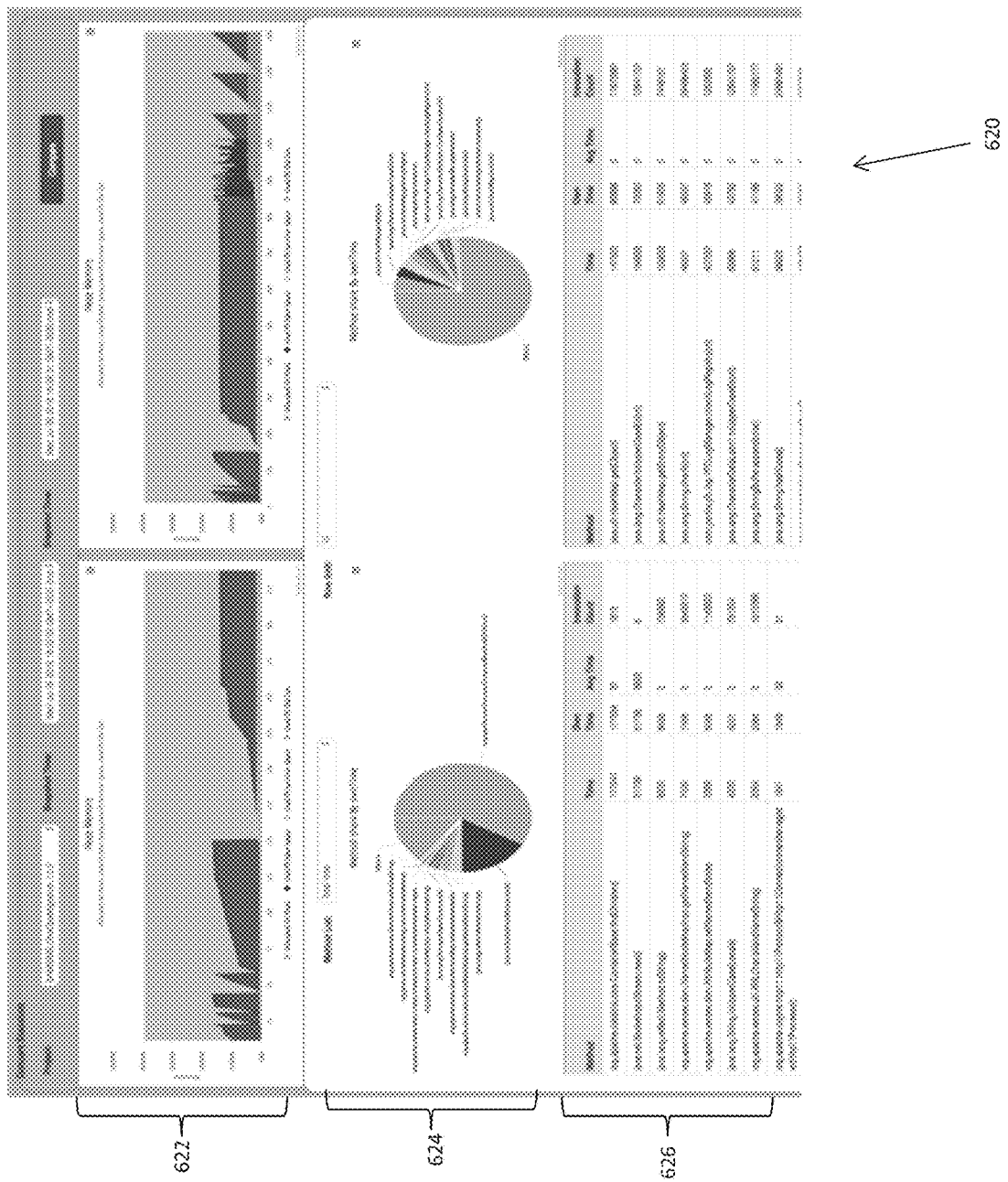

With reference to FIG. 6G, in response to selecting the snapshot archive option from the toolbar screen as shown in FIG. 6B, a snapshot archive navigation screen 612 can be rendered on the display of the user device. The snapshot archive navigation screen 612 can list the snapshots for the machines and/or identify the snapshots based on the time. A user can select and download a snapshot from the snapshot archive navigation screen 612.

With reference to FIG. 6F, a CPU profiling mode screen 614 can be used to select options for CPU profiling. CPU profiling can find CPU-intensive functions and packages in an executable module to facilitate changes and optimizations to the code of an executable module being profiled. A user can select between sampling mode or tracing mode in the CPU profiling mode screen 614. In response to selecting sampling mode, the profiler periodically queries stacks of running threads to estimate the slowest parts of the code and CPU time. Sampling can be selected when the goal is to locate and discover performance bottlenecks. In the sampling mode, the profiler adds virtually no overhead to the profiled application. When tracing mode is selected, the profiler instruments bytecode of the profiled application for recording thread CPU time spent inside each profiled method. Both times and invocation counts can be captured.

With reference to FIG. 6G, in response to selecting the CPU profiling mode from the CPU profiling mode screen as shown in 6H, a confirm enable profiling prompt 616 can be rendered on the display of the user device. The confirm enable profiling prompt 616 can include a confirmation message and an option to select a duration of the snapshot/tracing for the executable module (e.g., a time period over which the executable module is profiled).

With reference to 6H, a memory snapshot can be selected using the memory snapshot screen 618. A memory snapshot represents the memory state of the profiled application (e.g., the executable module) at the moment the memory snapshot is captured. The memory snapshot contains information about loaded classes and existing objects. In a non-limiting example, a memory snapshot can include a Yourkit Memory Snapshot format, which captures snapshots in your kit java profiler format; or a Hprof which is used for dumping heap snapshots to files in HPROF binary format. A user can also analyze these snapshots using 100PROF.

With reference to 6I, a comparison screen 620 can be rendered on the display of the user device. The comparison screen 620 can include a comparison of two snapshots of a executable module captured at different times. The comparison screen can include line graph 622 of the memory usage of the two snapshots; a pie chart 624 of the memory and processor utilization broken down by data structure (e.g., method) of the executable module; and a table indicating the memory and processor utilization broken down by the data structure of the executable code.

Figure 7:
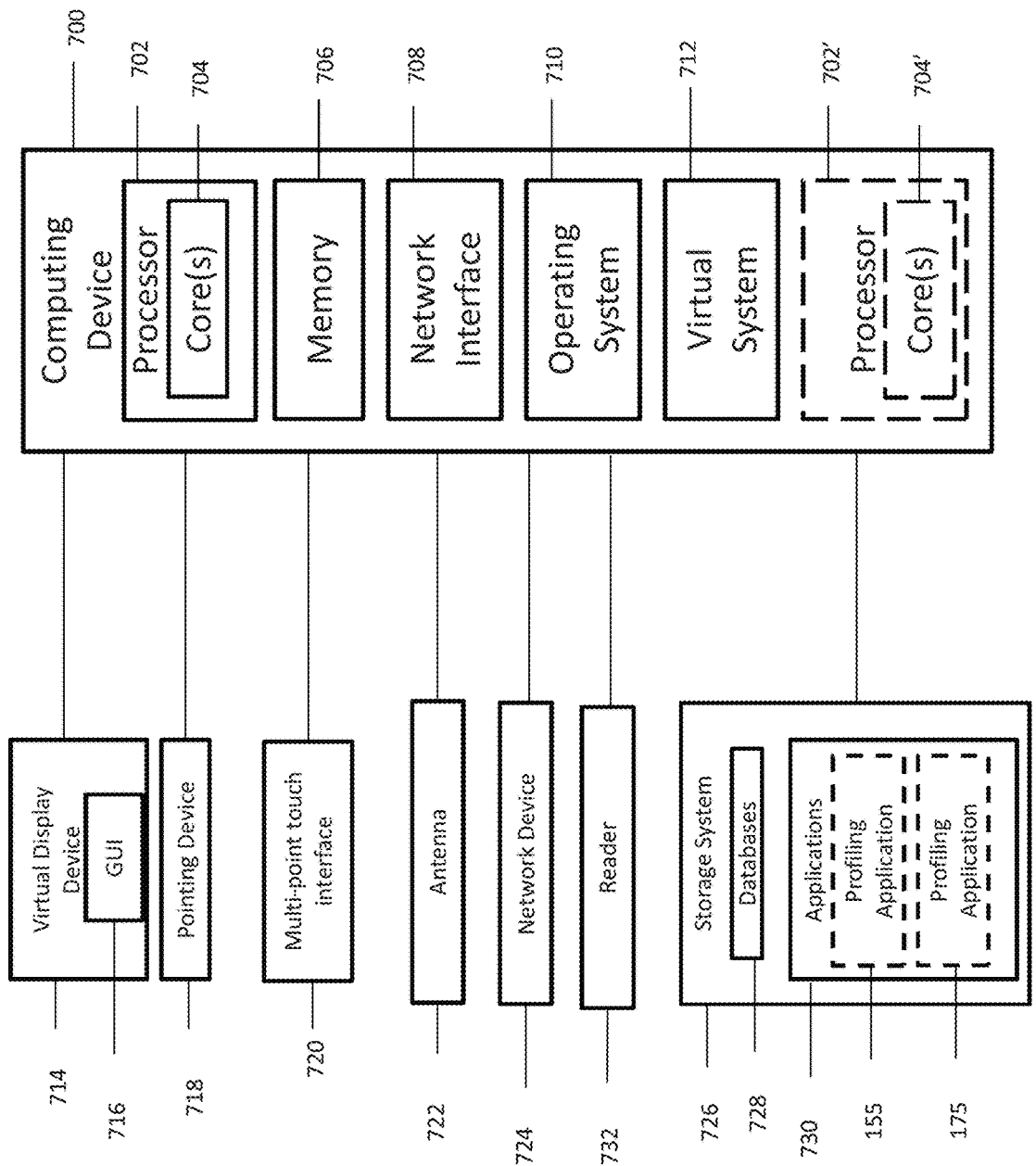
FIG. 7 is a block diagram illustrating of an exemplary computing device in accordance with exemplary embodiments of the present disclosure.

FIG. 7 is a block diagram of an example computing device for implementing exemplary embodiments. The computing device 700 may be, but is not limited to, a smartphone, laptop, tablet, desktop computer, server or network appliance. The computing device 700 can be embodied as part of the computing system, user device, or disparate computing system. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 706 included in the computing device 700 may store computer-readable and computer-executable instructions or software (e.g., applications 730 profiling application 155 and/or profiling interface application 175) for implementing exemplary operations of the computing device 700. The computing device 700 also includes configurable and/or programmable processor 702 and associated core(s) 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for implementing exemplary embodiments. Processor 702 and processor(s) 702' may each be a single core processor or multiple core (704 and 704') processor. Either or both of processor 702 and processor(s) 702' may be configured to execute one or more of the instructions described in connection with computing device 700.

Virtualization may be employed in the computing device 700 so that infrastructure and resources in the computing device 700 may be shared dynamically. A virtual machine 712 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 714, such as a computer monitor, which may display one or more graphical user interfaces 716, multi touch interface 720, a pointing device 718, a scanner 736 and a reader 732.

The computing device 700 may also include one or more storage devices 726, such as a hard-drive, CD-ROM, or other computer readable media, for storing data and computer-readable instructions and/or software that implement exemplary embodiments (e.g., applications i.e. the profiling application 155 and/or profiling interface application 175). For example, exemplary storage device 726 can include one or more databases 728 for storing information regarding utilization and memory snapshots. The databases 728 may be updated manually or automatically at any suitable time to add, delete, and/or update one or more data items in the databases.

The computing device 700 can include a network interface 708 configured to interface via one or more network devices 724 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 722 to facilitate wireless communication (e.g., via the network interface) between the computing device 700 and a network and/or between the computing device 700 and other computing devices. The network interface 708 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

The computing device 700 may run operating system 710, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 700 and performing the operations described herein. In exemplary embodiments, the operating system 710 may be run in native mode or emulated mode.

In an exemplary embodiment, the operating system 710 may be run on one or more cloud machine instances.

Figure 8:
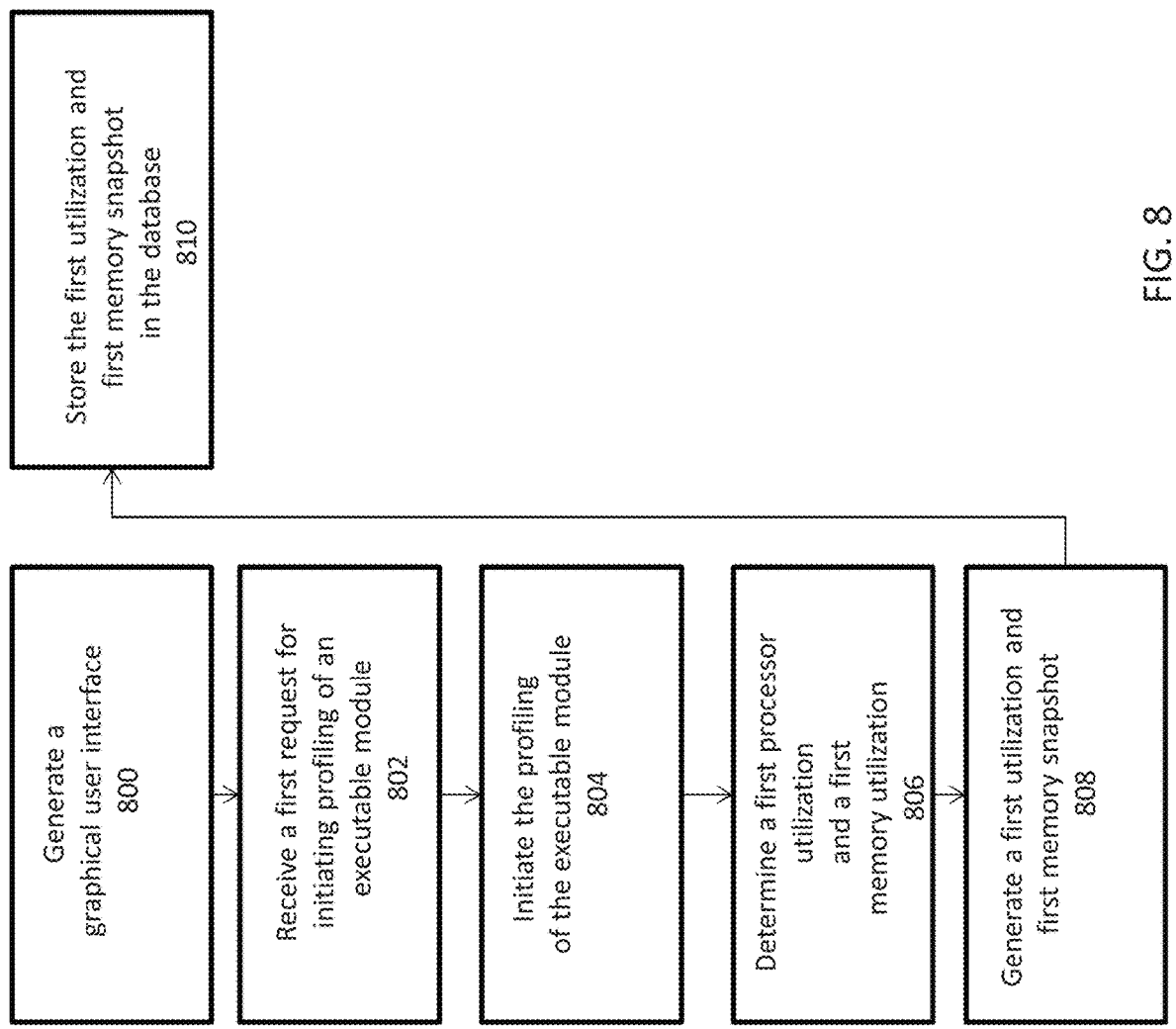
FIG. 8 is a flowchart illustrating an exemplary process in accordance with exemplary embodiments of the present disclosure.

FIG. 8 is a flowchart illustrating a profiling process according to an exemplary embodiment of the present disclosure. In operation 800, a computing system (e.g., computing system 150 as shown in FIG. 1) in communication with a database (e.g., utilization and memory databases 125 and 135 as shown in FIG. 1) can generate a graphical user interface through which a profiling application (e.g., profiling application 155 as shown in FIG. 1) is configured. In operation 802, the computing system can receive a first request for initiating profiling of an executable module including one or more data structures via the graphical user interface. The request can include information associated with the executable module. In operation 804, the computing system can initiate the profiling of the executable module based on the information associated with the executable module. Profiling can be initiated, via the computing system, in a sampling mode or a tracing mode. In operation 806, the computing system can determine a first processor utilization and/or a first memory utilization during execution of the executable module. One or more queries of the one or more data structures in the executable module can be periodically executed by the computing system to determine CPU time required by each of the one or more data structures in response to initiating the profiling in sampling mode. In operation 808, the computing system can generate a first utilization snapshot from the first processor utilization and a first memory snapshot from the first memory utilization at a specified period of time during execution of the executable module. In operation 810, the computing system can store the first utilization and first memory snapshot in the database. The utilization snapshot can include data associated with computer processor unit (CPU) utilization by the one or more data structures of the executable module. The memory snapshot can include data associated with memory usage by the one or more data structures of the executable module. A graphical user interface (GUI) including graphical representations of the first utilization snapshot and the first memory snapshot can be rendered on a display of a user device, wherein the GUI can include previous utilization and memory snapshots captured prior to the first utilization and memory snapshots.

In some embodiments, a second request can be received from the user device to generate a first graphical representation of a comparison of the first utilization snapshot and a second utilization snapshot captured before the first utilization snapshot. The database can be queried to retrieve the second utilization snapshot and the first graphical representation of the comparison of the first and second utilization snapshots can be generated.

In some embodiments, a third request can be received from the user device to generate a second graphical representation of a comparison of the first memory snapshot and a second memory snapshot captured before the first utilization snapshot. The database can be queried to retrieve the second memory snapshot and the second graphical representation of the comparison of the first and second memory snapshots can be generated. The first and second graphical representations can include a breakdown by each of the one or more data structures of the executed module.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A profiling system comprising:
a disparate computing system comprising an executable module, the executable module configured to be executed in a programming environment of the disparate computing system;
a user device separate and distinct from the disparate computing system, the user device configured to send a first request to a computing system to initiate profiling of the executable module of the disparate computing system; and
the computing system separate and distinct from the user device and the disparate computing system, the computing system equipped with one or more processors and in communication with a database and configured to:
generate a graphical user interface through which a profiling application is configured;
receive the first request to initiate profiling of the executable module of the disparate computing system, wherein the executable module includes one or more data structures via the graphical user interface, the request including information associated with the executable module, wherein the information comprises a storage location of the executable module located on the disparate computing system;
initiate the profiling of the executable module of the disparate computing system based on the information associated with the executable module;
determine a first processor utilization of the disparate computing system and a first memory utilization of the disparate computing system during execution of the executable module;
generate a first utilization snapshot from the first processor utilization and a first memory snapshot from the first memory utilization at a specified period of time during execution of the executable module, wherein the first memory snapshot includes data associated with memory usage by the one or more data structures of the executable module; and
store the first utilization and first memory snapshot in the database.

2. The system of claim 1, wherein the first utilization snapshot includes data associated with computer processor unit (CPU) utilization by the one or more data structures of the executable module.

3. The system of claim 1, wherein the computing system is configured to initiate the profiling of the executable module in a sampling mode or a tracing mode.

4. The system of claim 3, wherein in response to initiating the profiling in sampling mode, the computing system is configured to periodically execute one or more queries of the one or more data structures in the executable module to determine CPU time required by each of the one or more data structures.

5. The system of claim 1, further comprising the user device executing an application, the application when executed configured to:
render the graphical user interface (GUI) including graphical representations of the first utilization snapshot and the first memory snapshot.

6. The system of claim 5, wherein the GUI includes previous utilization and memory snapshots captured prior to the first utilization and memory snapshots.

7. The system of claim 5, wherein the computing system is configured to:
receive a second request from the user device to generate a first graphical representation of a comparison of the first utilization snapshot and a second utilization snapshot captured before the first utilization snapshot;
query the database to retrieve the second utilization snapshot;
generate the first graphical representation of the comparison of the first and second utilization snapshots; and
instruct the user device to render the first graphical representation, via the application.

8. The system of claim 7, wherein the computing system is configured to:
receive a third request from the user device to generate a second graphical representation of a comparison of the first memory snapshot and a second memory snapshot captured before the first memory snapshot;
query the database to retrieve the second memory snapshot;
generate the second graphical representation of the comparison of the first and second memory snapshots; and
instruct the user device to render the second graphical representation, via the application.

9. The system of claim 8, wherein the first and second graphical representations include a breakdown by each of the one or more data structures of the executed module.

10. The system of claim 1, wherein the user device is further configured to:
authenticate login credentials received from a user prior to the computing system initiating the profiling of the executable module of the disparate computing system;
determine whether a project and environment setup has previously been created in response to the login credentials being authenticated; and
receive an application instance Internet Protocol (IP)/hostname associated with the executable module to be profiled in response to the determination that the project and environment setup has not been previously created.

11. The system of claim 1, wherein the user device is further configured to:
authenticate login credentials received from a user prior to the computing system initiating the profiling of the executable module of the disparate computing system;
determine whether a project and environment setup has previously been created in response to the login credentials being authenticated;

receive a selection from the user of a project associated with the executable module to be profiled in response to the determination that the project and environment setup has already been previously created; and transmit the selected project to the computing system.

12. A profiling method comprising:

executing, by a disparate computing system, an executable module in a programming environment of the disparate computing system, wherein the disparate computing system comprises the executable module;

generating, via a computing system separate and distinct from the disparate computing system, in communication with a database, a graphical user interface through which a profiling application is configured;

sending, by a user device separate and distinct from the computing system and the disparate computing system, a first request to the computing system to initiate profiling of the executable module;

receiving, via the computing system, the first request from the user device to initiate profiling of the executable module that is located on the disparate computing system, wherein the executable module includes one or more data structures via the graphical user interface, the request including information associated with the executable module, and wherein the information comprises a storage location of the executable module;

initiating, via the computing system, the profiling of the executable module of the disparate computing system based on the information associated with the executable module;

determining, via the computing system, a first processor utilization of the disparate computing system and a first memory utilization of the disparate computing system during execution of the executable module;

generating, via the computing system, a first utilization snapshot from the first processor utilization and a first memory snapshot from the first memory utilization at a specified period of time during execution of the executable module, wherein the first memory snapshot includes data associated with memory usage by the one or more data structures of the executable module; and storing, via the computing system, the first utilization and first memory snapshot in the database.

13. The method of claim 12, wherein the first utilization snapshot includes data associated with computer processor unit (CPU) utilization by the one or more data structures of the executable module.

14. The method of claim 12, further comprising initiating, via the computing system, the profiling of the executable module in a sampling mode or a tracing mode.

15. The method of claim 14, further comprising periodically executing, via the computing system, one or more queries of the one or more data structures in the executable module to determine CPU time required by each of the one or more data structures, in response to initiating the profiling in sampling mode.

16. The method of claim 12, further comprising rendering, via the user device executing an application, the graphical user interface (GUI) including graphical representations of the first utilization snapshot and the first memory snapshot.

17. The method of claim 16, wherein the GUI includes previous utilization and memory snapshots captured prior to the first utilization and memory snapshots.

18. The method of claim 16, further comprising:

receiving, via the computing system, a second request from the user device to generate a first graphical representation of a comparison of the first utilization snapshot and a second utilization snapshot captured before the first utilization snapshot;

querying, via the computing system, the database to retrieve the second utilization snapshot;

generating, via the computing system, the first graphical representation of the comparison of the first and second utilization snapshots; and instructing, via the computing system, the user device to render the first graphical representation, via the application.

19. The method of claim 18, further comprising:

receiving, via the computing system, a third request from the user device to generate a second graphical representation of a comparison of the first memory snapshot and a second memory snapshot captured before the first memory snapshot;

querying, via the computing system, the database to retrieve the second memory snapshot;

generating, via the computing system, the second graphical representation of the comparison of the first and second memory snapshots; and instructing, via the computing system, the user device to render the second graphical representation, via the application.

20. The method of claim 19, wherein the first and second graphical representations include a breakdown by each of the one or more data structures of the executed module.

* * * * *